US012620599B2

(12) United States Patent
Horikawa et al.

(10) Patent No.: US 12,620,599 B2
(45) Date of Patent: May 5, 2026

(54) LAYERED BODY, NEGATIVE ELECTRODE CURRENT COLLECTOR FOR LITHIUM ION SECONDARY BATTERY, AND NEGATIVE ELECTRODE FOR LITHIUM ION SECONDARY BATTERY

(71) Applicant: TDK CORPORATION, Tokyo (JP)

(72) Inventors: Yuhei Horikawa, Tokyo (JP); Makoto Endo, Tokyo (JP); Takuya Kakiuchi, Tokyo (JP); Miyuki Yanagida, Tokyo (JP); Yuki Naito, Tokyo (JP); Takahiro Tashiro, Tokyo (JP)

(73) Assignee: TDK CORPORATION, Tokyo (JP)

( * ) Notice: Subject to any disclaimer, the term of this patent is extended or adjusted under 35 U.S.C. 154(b) by 524 days.

(21) Appl. No.: 18/268,643

(22) PCT Filed: Dec. 16, 2021

(86) PCT No.: PCT/JP2021/046577
§ 371 (c)(1),
(2) Date: Jun. 21, 2023

(87) PCT Pub. No.: WO2022/158187
PCT Pub. Date: Jul. 28, 2022

(65) Prior Publication Data
US 2024/0047695 A1 Feb. 8, 2024

(30) Foreign Application Priority Data
Jan. 20, 2021 (JP) ................................ 2021-007171

(51) Int. Cl.
*H01M 4/66* (2006.01)
*H01M 4/38* (2006.01)
(Continued)

(52) U.S. Cl.
CPC ........... *H01M 4/667* (2013.01); *H01M 4/386* (2013.01); *H01M 4/661* (2013.01); *H01M 10/0525* (2013.01); *H01M 2004/027* (2013.01)

(58) Field of Classification Search
CPC ...... H01M 4/667; H01M 4/386; H01M 4/661; H01M 10/0525; H01M 2004/027;
(Continued)

(56) References Cited

U.S. PATENT DOCUMENTS

| | | | | |
|---|---|---|---|---|
| 11,639,557 B2 * | 5/2023 | Kaidi | ...................... | B32B 15/01 |
| | | | | 428/656 |
| 2021/0175513 A1 * | 6/2021 | Horie | ...................... | B32B 15/20 |
| 2022/0127743 A1 | 4/2022 | Kaidi et al. | | |

FOREIGN PATENT DOCUMENTS

| | | |
|---|---|---|
| JP | 2005-197205 A | 7/2005 |
| JP | 2018-180098 A | 11/2018 |

(Continued)

OTHER PUBLICATIONS

Feb. 15, 2022 International Search Report issued in International Patent Application No. PCT/JP2021/046577.
(Continued)

*Primary Examiner* — Daniel H Lee
(74) *Attorney, Agent, or Firm* — Oliff PLC

(57) ABSTRACT

A laminated body contains a first metal layer containing copper; and a second metal layer containing nickel and laminated directly on the first metal layer. A first surface of the second metal layer is a surface in contact with the first metal layer. A second surface of the second metal layer is a reverse face of the first surface. A thickness direction of the second metal layer is a direction approximately perpendicular to the first surface and oriented from the first surface toward the second surface. A unit of a content of nickel in the second metal layer is % by mass. The content of nickel
(Continued)

in the second metal layer 2 decreases along the thickness direction D.

9 Claims, 4 Drawing Sheets

(51) Int. Cl.
   *H01M 10/0525*          (2010.01)
   *H01M 4/02*              (2006.01)
(58) Field of Classification Search
   CPC ......... H01M 4/134; H01M 4/66; Y02E 60/10;
   B32B 15/01
   See application file for complete search history.

(56)                         References Cited

FOREIGN PATENT DOCUMENTS

JP          2019-186134 A      10/2019
JP          2020-180366 A      11/2020

OTHER PUBLICATIONS

Jul. 20, 2023 International Preliminary Report on Patentability issued in International Patent Application No. PCT/JP2021/046577.

* cited by examiner

LAYERED BODY, NEGATIVE ELECTRODE CURRENT COLLECTOR FOR LITHIUM ION SECONDARY BATTERY, AND NEGATIVE ELECTRODE FOR LITHIUM ION SECONDARY BATTERY

TECHNICAL FIELD

The present disclosure relates to a laminated body, a negative electrode current collector for a lithium ion secondary battery, and a negative electrode for a lithium ion secondary battery.

BACKGROUND ART

A negative electrode current collector for a lithium ion secondary battery is subjected to repeated loads (compressive stress and tensile stress), due to fluctuating of the volume of the negative electrode active material layer laminated on the negative electrode current collector associated with charging and discharging. Deformation of the negative electrode current collector attributed to these loads causes deformation of the battery main body or short-circuiting between electrodes. Therefore, the negative electrode current collector is required to have durability against the loads. For example, the following Patent Literature 1 discloses, as a negative electrode current collector having tensile strength, a negative electrode current collector in which an electrode foil containing copper and a hard nickel plating layer are laminated. The following Patent Literature 2 discloses, as a current collector having sufficient strength for suppressing cracking and tearing, a current collector in which a first metal layer consisting of copper and a second metal layer consisting of nickel or a nickel alloy are laminated.

CITATION LIST

Patent Literature

Patent Literature 1: Japanese Unexamined Patent Publication No. 2005-197205
Patent Literature 2: Japanese Unexamined Patent Publication No. 2019-186134

SUMMARY OF INVENTION

Technical Problem

As in the case of the above-mentioned conventional negative electrode current collectors, when a laminated body has a first metal layer that contains copper and a second metal layer that contains nickel and is laminated directly on the first metal layer, as the laminated body is repeatedly subjected to stress, the second metal layer is likely to be peeled from the first metal layer. The inventors found that peeling of the second metal layer from the first metal layer is attributed to the difference in hardness (elastic modulus) between the first metal layer and the second metal layer. For example, the Young's modulus of the second metal layer containing nickel tends to be higher than the Young's modulus of the first metal layer containing copper. That is, the second metal layer containing nickel is hard compared with the first metal layer containing copper and is less likely to be deformed due to stress. Furthermore, the elastic modulus of the second metal layer tends to increase with an increase in contents of additive elements other than nickel in the second metal layer, and the second metal layer tends to become hard.

An object of one aspect of the present invention is to provide a laminated body having a first metal layer containing copper and a second metal layer containing nickel, in which peeling of the second metal layer from the first metal layer is suppressed, a negative electrode current collector and a negative electrode for a lithium ion secondary battery, both of which contain the laminated body.

Solution to Problem

A laminated body according to one aspect of the present invention contains a first metal layer containing copper and a second metal layer containing nickel and laminated directly on the first metal layer, a first surface of the second metal layer is a surface in contact with the first metal layer, a second surface of the second metal layer is a reverse face of the first surface, a thickness direction of the second metal layer is a direction approximately perpendicular to the first surface and oriented from the first surface toward the second surface, a unit of a content of nickel in the second metal layer is % by mass, and the content of nickel in the second metal layer decreases along the thickness direction.

The second metal layer may further contain at least one element selected from the group consisting of phosphorus and tungsten.

The second metal layer may consist of a plurality of nickel-containing layers laminated in the thickness direction, and a content of nickel in each of the plurality of nickel-containing layers may be different from each other.

A thickness of the first metal layer is represented by $T1$, a thickness of the second metal layer is represented by $T2$, and $T2/T1$ may be 0.6 or more and 1.0 or less.

The content of nickel in the second metal layer may be the highest in the vicinity of the first surface, may decrease stepwise along the thickness direction, and may be the lowest in the vicinity of the second surface.

The content of nickel in the second metal layer may be the highest in the vicinity of the first surface, may decrease continuously along the thickness direction, and may be the lowest in the vicinity of the second surface.

A negative electrode current collector for a lithium ion secondary battery according to one aspect of the present invention contains the above-described laminated body.

A negative electrode for a lithium ion secondary battery according to one aspect of the present invention contains the above-described negative electrode current collector and a negative electrode active material layer containing a negative electrode active material, and the negative electrode active material layer is laminated directly on the second surface of the second metal layer.

The negative electrode active material may contain silicon.

Advantageous Effects of Invention

According to one aspect of the present invention, there are provided a laminated body having a first metal layer containing copper and a second metal layer containing nickel, in which peeling of the second metal layer from the first metal layer is suppressed, a negative electrode current collector and a negative electrode for a lithium ion secondary battery, both of which contain the laminated body.

DESCRIPTION OF EMBODIMENTS

Figure 1:
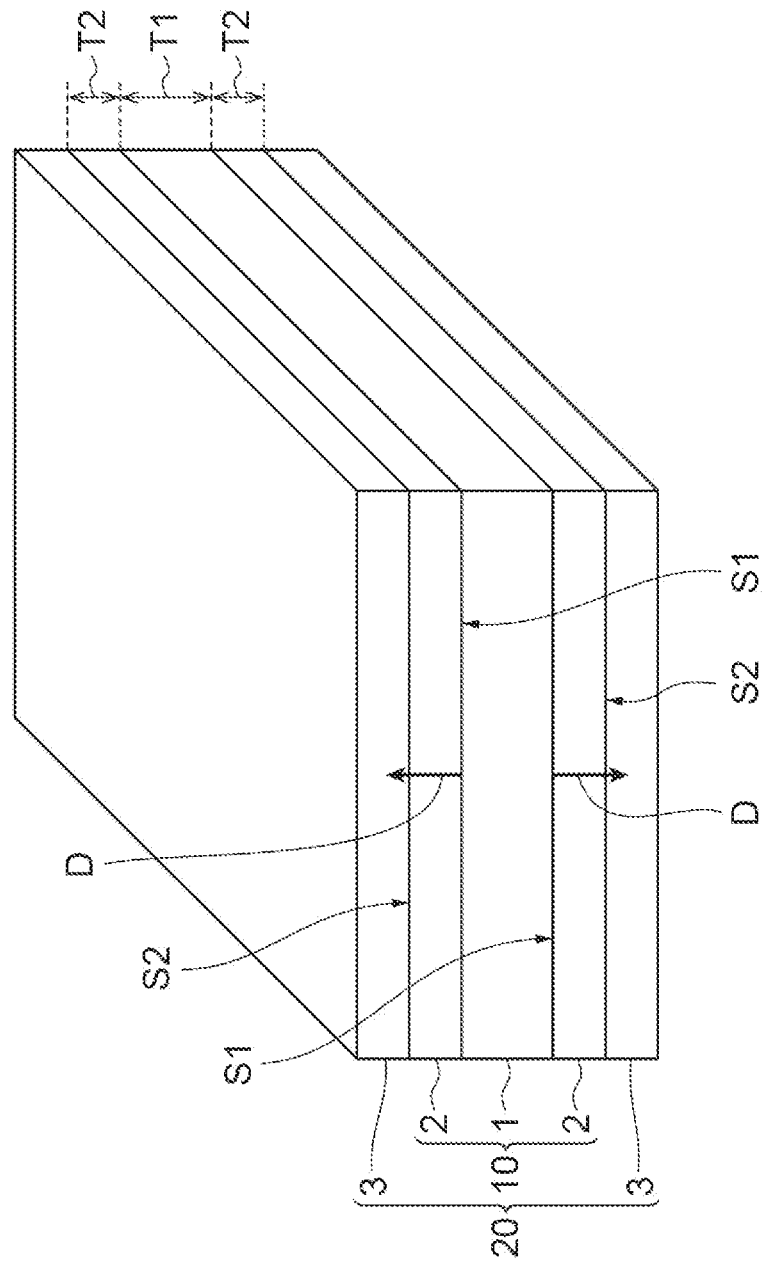
FIG. 1 is a schematic perspective view of a laminated body (negative electrode current collector) according to an embodiment of the present invention and a negative electrode containing the laminated body.

Preferred embodiments of the present invention will be described below with reference to the drawings. In the drawings, equivalent constituent elements will be assigned with equivalent reference numerals. The present invention is not intended to be limited to the following embodiments.

A laminated body according to the present embodiment is a negative electrode current collector for a lithium ion secondary battery. As shown in FIG. 1, the laminated body 10 according to the present embodiment has a first metal layer 1 and second metal layers 2. The first metal layer 1 contains copper (Cu). The second metal layer 2 contains nickel (Ni). Since the laminated body 10 has not only the first metal layer 1 but also the second metal layers 2 laminated on the first metal layer 1, the laminated body 10 can have higher tensile strength than conventional current collectors consisting only of one metal layer containing Cu. In the case of the laminated body 10 shown in FIG. 1, each of the second metal layers 2 is laminated directly on both the surfaces of the first metal layer 1. However, the second metal layer 2 may be laminated directly on only one surface of the first metal layer 1. A first surface S1 of the second metal layer 2 is a surface in contact with the first metal layer 1. The first surface S1 of the second metal layer 2 may be rephrased as an interface between the first metal layer 1 and the second metal layer 2. A second surface S2 of the second metal layer 2 is a reverse face of the first surface S1. A thickness direction D of the second metal layer 2 is a direction approximately perpendicular to the first surface S1 and oriented from the first surface S1 toward the second surface S2.

As shown in FIG. 1, a negative electrode 20 for a lithium ion secondary battery according to the present embodiment has a laminated body 10 (negative electrode current collector) and negative electrode active material layers 3. The negative electrode active material layer 3 contains a negative electrode active material. The negative electrode active material layer 3 is laminated directly on each of the second surfaces S2 of the second metal layer 2.

A lithium ion secondary battery according to the present embodiment may contain a negative electrode 20, a positive electrode, a separator, and an electrolyte solution. The separator and the electrolyte solution are disposed between the negative electrode 20 and the positive electrode. The electrolyte solution permeates through the separator. The positive electrode may contain a positive electrode current collector and a positive electrode active material layer laminated on the positive electrode current collector. For example, the positive electrode current collector may be an aluminum foil or a nickel foil. The positive electrode active material layer contains a positive electrode active material. For example, the positive electrode active material may be one or more compounds selected from the group consisting of lithium cobaltate ($LiCoO_2$), lithium nickelate ($LiNiO_2$), lithium manganate ($LiMnO_2$), lithium manganese spinel ($LiMn_2O_4$), $LiNi_xCo_yMn_zM_aO_2$ (wherein x+y+z+a=1, $0 \leq x < 1$, $0 \leq y < 1$, $0 \leq z < 1$, $0 \leq a < 1$, and M represents one or more kinds of elements selected from the group consisting of Al, Mg, Nb, Ti, Cu, Zn, and Cr), a lithium-vanadium compound ($LiV_2O_5$), olivine type $LiMPO_4$ (wherein M represents one or more kinds of elements selected from Co, Ni, Mn, Fe, Mg, Nb, Ti, Al, and Zr, or VO), lithium titanate ($Li_4Ti_5O_{12}$), $LiNi_xCo_yAl_zO_2$ (wherein $0.9 < x+y+z < 1.1$), polyacetylene, polyaniline, polypyrrole, polythiophene, and polyacene. The positive electrode active material layer may further contain a conductive aid such as carbon or a metal powder. The positive electrode active material layer may further contain a binder (an adhesive or a resin). The separator may be one or more films (film or a laminated body) formed from a porous polymer having an electrical insulation property. The electrolyte solution contains a solvent and an electrolyte (lithium salt). The solvent may be water or an organic solvent. For example, the electrolyte (lithium salt) may be one or more lithium compounds selected from the group consisting of $LiPF_6$, $LiClO_4$, $LiBF_4$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB.

Figure 2:
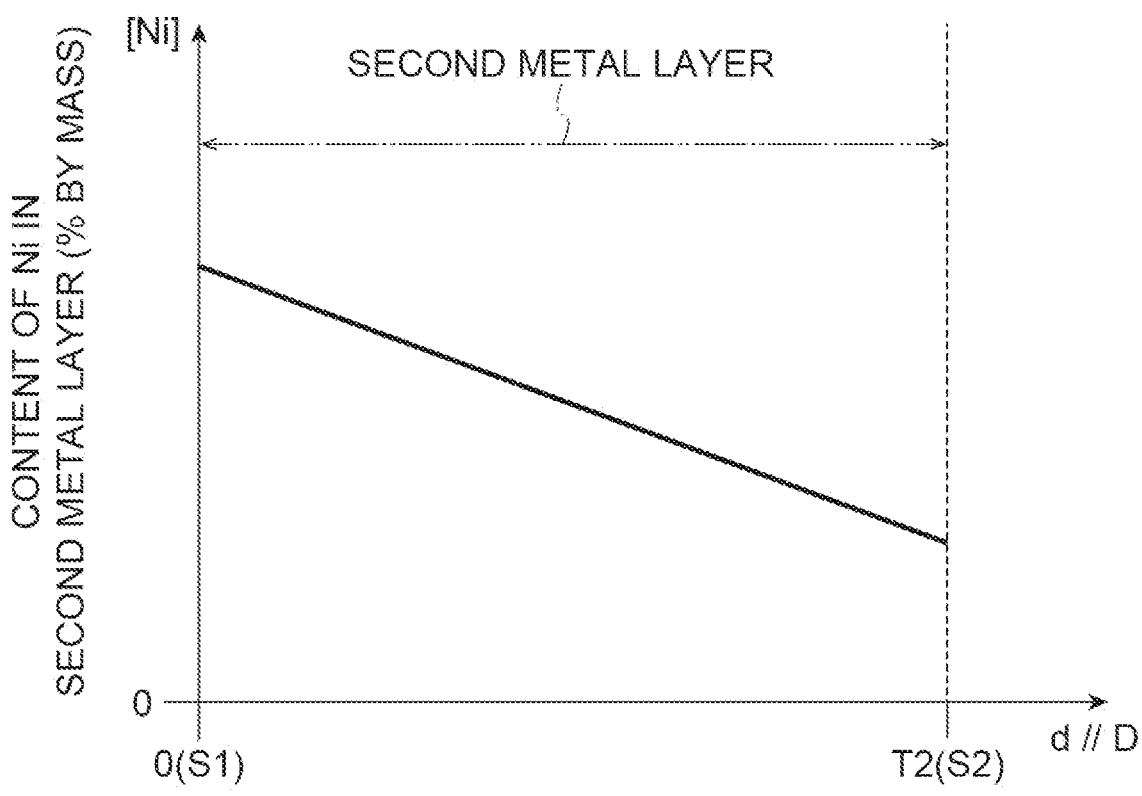
FIG. 2 is a graph showing an example of the distribution of the content of nickel in a second metal layer.

A unit of a content of Ni in the second metal layer 2 is % by mass. The content of Ni in the second metal layer 2 decreases along the thickness direction D of the second metal layer 2. That is, the content of Ni in the second metal layer 2 is the highest in the vicinity of the first surface S1, decreases gradually or stepwise from the first surface S1 toward the second surface S2, and is the lowest in the vicinity of the second surface S2. The graph of FIG. 2 shows an example of the distribution of the content of Ni in the second metal layer 2. A horizontal axis of the graph of FIG. 2 represents a distance d from the first surface S1 in the thickness direction D of the second metal layer 2. A vertical axis of the graph of FIG. 2 represents the content of Ni ([Ni]) at a position where the distance from the first surface S1 in the second metal layer 2 is d. As shown in FIG. 2, the content of Ni in the second metal layer 2 may decrease continuously (gradually) along the thickness direction D. The distribution of the content of Ni in the second metal layer 2 may be represented by a straight line. The distribution of the content of Ni in the second metal layer 2 may be represented by a curve.

As the content of Ni in the second metal layer 2 decreases along the thickness direction D, peeling of the second metal layer 2 from the first metal layer 1 can be suppressed. The mechanism by which peeling of the second metal layer 2 from the first metal layer 1 is suppressed is as follows. However, the following mechanism is only a hypothesis, and the technical scope of the present invention is not limited by the following mechanism.

As the content of Ni in the second metal layer 2 is higher, the elastic modulus of the second metal layer 2 is lower. As the elastic modulus of the second metal layer 2 is lower, the second metal layer 2 is softer, and the difference in the elastic modulus between the first metal layer 1 and the second metal layer 2 is reduced.

Since the content of Ni in the second metal layer 2 decreases along the thickness direction D, the elastic modulus of the second metal layer 2 increases along the thickness direction D. That is, the elastic modulus of the second metal layer 2 is the lowest in the vicinity of the first surface S1, increases gradually or stepwise from the first surface S1 toward the second surface S2, and is the highest in the vicinity of the second surface S2. Therefore, the difference in the elastic modulus between the first metal layer 1 and the second metal layer 2 decreases along a direction opposite to the thickness direction D and becomes the smallest at the first surface S1. That is, the first surface S1 at which the elastic modulus is the lowest in the second metal layer 2 (first surface S1 that is the softest in the second metal layer 2) is in contact with the soft first metal layer 1. As a result, the first surface S1 side of the second metal layer 2 is likely to be deformed to the same extent as the first metal layer 1 depending on the stress repeatedly acting on the laminated body 10 due to the volume fluctuation of the negative electrode active material layer 3, and peeling of the second metal layer 2 from the first metal layer 1 is suppressed. Furthermore, as the elastic modulus of the second metal layer 2 increases gradually or stepwise along the thickness direction D, the stress acting on the second metal layer 2 due to the volume fluctuation of the negative electrode active material layer 3 is dispersed. As a result, deformation of the second metal layer 2 is suppressed, and peeling of the second metal layer 2 from the first metal layer 1 is also suppressed.

In order to increase an energy density of a lithium ion secondary battery, a negative electrode contained in a package of the battery is wound into a roll form or is folded, in a state of being laminated with a separator, an electrolyte, and a positive electrode. Since the stress is likely to act on a folded portion in the laminated body (negative electrode current collector) constituting the negative electrode, the second metal layer is likely to be peeled from the first metal layer at the folded portion in a conventional laminated body. On the other hand, according to the present embodiment, peeling of the second metal layer 2 from the first metal layer 1 at the folded portion in the laminated body 10 can be suppressed.

The second metal layer 2 may consist of a plurality of nickel-containing layers laminated in the thickness direction D, and a content of Ni in each of the plurality of nickel-containing layers may be different from each other. In other words, the plurality of the nickel-containing layers may be distinguished from each other based on the content of Ni. The content of Ni may be constant in each of the nickel-containing layers. The content of Ni may decrease along the thickness direction D in each of the nickel-containing layers. A thickness of each of the nickel-containing layers may be uniform. The number "n" of the nickel-containing layers constituting the second metal layer 2 is an integer of 2 or more and is not particularly limited. For example, any pair of nickel-containing layers constituting the second metal layer 2 are represented as the (k−1)-th nickel-containing layer and the k-th nickel-containing layer. "k" is any integer of 2 or more and n or less. The k-th nickel-containing layer is laminated directly on the (k−1)-th nickel-containing layer in the thickness direction D of the second metal layer 2. When "k" is 2, the (k−1)-th nickel-containing layer (that is, a first nickel-containing layer) is laminated directly on the first metal layer 1. A distance between the first metal layer 1 and the k-th nickel-containing layer is larger than the distance between the first metal layer 1 and the (k−1)-th nickel-containing layer, and the content of Ni in the k-th nickel-containing layer is lower than the content of Ni in the (k−1)-th nickel-containing layer.

Figure 3:
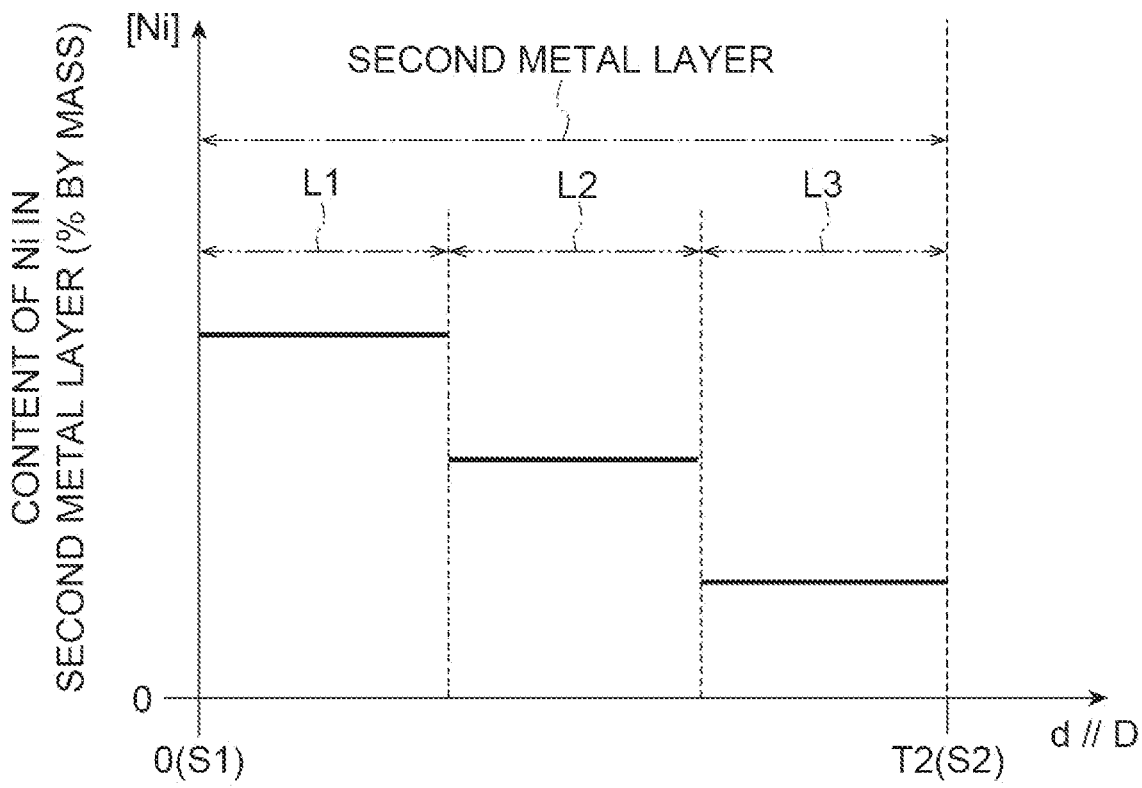
FIG. 3 is a graph showing another example of the distribution of the content of nickel in the second metal layer.

For example, when the number "n" of the nickel-containing layers constituting the second metal layer 2 is 3, the second metal layer 2 consists of a first nickel-containing layer, a second nickel-containing layer, and a third nickel-containing layer. The first nickel-containing layer is laminated directly on the first metal layer 1, the second nickel-containing layer is laminated directly on the first nickel-containing layer, and the third nickel-containing layer is laminated directly on the second nickel-containing layer. A graph of FIG. 3 shows a distribution of a content of Ni in the second metal layer 2 when "n" is 3. A horizontal axis of the graph of FIG. 3 is the same as the horizontal axis of the graph of FIG. 2, and the vertical axis of the graph of FIG. 3 is the same as the vertical axis of the graph of FIG. 2. As shown in FIG. 3, a content of Ni in the third nickel-containing layer L3 is lower than a content of Ni in the second nickel-containing layer L2, and the content of Ni in the second nickel-containing layer L2 is lower than a content of Ni in the first nickel-containing layer L1. The content of Ni may be constant inside of each of the first nickel-containing layer L1, the second nickel-containing layer L2, and the third nickel-containing layer L3, and the content of Ni in the second metal layer 2 may decrease stepwise along the thickness direction D.

Ni may be a main component of the second metal layer 2. That is, when the second metal layer 2 contains a plurality of kinds of elements, the content of Ni may be the highest. The content of Ni in the second metal layer 2 may be, for example, 60% by mass or more and less than 100% by mass, or 60% by mass or more and 99% by mass or less. When the second metal layer 2 contains three or more kinds of elements, the content of Ni in the second metal layer 2 may be less than 50% by mass. A part of the second metal layer 2 may be simple substance of Ni. At least a part or the whole of the second metal layer 2 may be an alloy containing Ni, or an intermetallic compound containing Ni. When the content of Ni in the second metal layer 2 is in the above-described range, peeling of the second metal layer 2 from the first metal layer 1 is likely to be suppressed.

The content of Ni in the second metal layer 2 is the maximum in the vicinity of the first surface S1 of the second metal layer 2. The maximum value of the content of Ni in the second metal layer 2 is represented by $[Ni]_{MAX}$. The content of Ni in the second metal layer 2 is the minimum in the vicinity of the second surface S2 of the second metal layer 2. The minimum value of the content of Ni in the second metal layer 2 is represented by $[Ni]_{MIN}$. $\Delta[Ni]$ is defined as $[Ni]_{MAX}-[Ni]_{MIN}$. $\Delta[Ni]$ may be 4% by mass or more and 18% by mass or less, or 6% by mass or more and 12% by mass or less. When $\Delta[Ni]$ is in the above-described ranges, peeling of the second metal layer 2 from the first metal layer 1 is likely to be suppressed.

The second metal layer 2 may further contain at least one element (additive element) selected from the group consisting of phosphorus (P) and tungsten (W). Among all elements constituting the second metal layer 2, all the elements other than Ni may be additive elements. Since a sum of contents of the additive elements in the second metal layer 2 increases along the thickness direction D of the second metal layer 2, the content of Ni in the second metal layer 2 decreases along the thickness direction D of the second metal layer 2. That is, the sum of contents of the additive elements in the second metal layer 2 is the lowest in the vicinity of the first surface S1, increases gradually or stepwise from the first surface S1 toward the second surface S2, and is the highest in the vicinity of the second surface S2. The second metal layer 2 may further contain additive elements other than P and W. When the second metal layer 2 contains additive elements other than P and W, the second metal layer 2 does not have to contain P and W.

The second metal layer 2 may be formed by an electrolytic plating method or an electroless plating method. A heat treatment of the second metal layer 2 formed by the electrolytic plating method or the electroless plating method may be carried out. As shown in Examples described below, according to the electrolytic plating method or the electroless plating method, the content of Ni in the second metal layer 2 can be decreased along the thickness direction D of the second metal layer 2. For example, control factors of the distribution of the content of Ni in the second metal layer 2 may be a composition of a plating solution, a content of each raw material and a proportion thereof in the plating solution, a temperature of the plating solution, a pH of the plating solution, a current density of the first metal layer 1, a duration time of plating, and the like. The raw materials contained in the plating solution may be, for example, a compound containing Ni, and compounds containing the above-described additive elements. As a content of the compound containing Ni in the plating solution used for forming each nickel-containing layer is larger, the content of Ni in each nickel-containing layer is higher. The second metal layer 2 consisting of a plurality of nickel-containing layers having different content of Ni may be formed by carrying out the plating method a plurality of times in which the above-described control factors are different. That is, a content of Ni in each of the plurality of nickel-containing layers constituting the second metal layer 2 may be controlled so that the content of Ni in the second metal layer 2 decreases along the thickness direction D of the second metal layer 2. The second metal layer 2 in which the content of Ni decreases along the thickness direction D may be formed by decreasing a current density of the first metal layer continuously or stepwise along with the passage of time during the electrolytic plating.

Cu may be a main component of the first metal layer 1. The first metal layer 1 may consist only of Cu. The first metal layer 1 may consist of an alloy containing Cu. As the first metal layer 1 contains Cu, the laminated body 10 can have high conductivity that is required for a negative electrode current collector for a lithium ion secondary battery.

The negative electrode active material contained in the negative electrode active material layer 3 may be a material capable of intercalating and deintercalating lithium ions and is not particularly limited. For example, the negative electrode active material contained in the negative electrode active material layer 3 may contain silicon (Si). The negative electrode active material containing silicon easily expands and contracts associated with charging and discharging of the lithium ion secondary battery, as compared with other negative electrode active materials. The laminated body 10 (second metal layer 2) is repeatedly subjected to the tensile stress due to the volume fluctuation of the negative electrode active material layer 3 associated with charging and discharging. However, according to the present embodiment, peeling of the second metal layer 2 from the first metal layer 1 caused by the volume fluctuation of the negative electrode active material layer 3 is suppressed.

The negative electrode active material containing silicon may be simple substance of silicon, an alloy containing silicon, or a compound containing silicon (oxide, silicate, or the like). For example, the alloy containing silicon may contain at least one element selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). For example, the compound containing silicon may contain at least one element selected from the group consisting of boron (B), nitrogen (N), oxygen (O), and carbon (C). For example, the negative electrode active material containing silicon may be at least one compound selected from the group consisting of $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_X$ $(0<X\le2)$, and LiSiO. The negative electrode active material may be fibers (nanowires or the like) containing silicon, or particles (nanoparticles or the like) containing silicon. The negative electrode active material layer 3 may further contain a binder. The binder binds the negative electrode active materials to each other and binds the negative electrode active material layer 3 with the surface of the second metal layer 2.

A thickness T1 of the first metal layer 1 may be, for example, 1 μm or more and 8 μm or less. A thickness T2 of one second metal layer 2 may be, for example, 0.3 μm or more and 4 μm or less, or 1.0 μm or more and 2 μm or less. A total of the thicknesses T2 of a plurality of second metal layers 2 may be represented by $T2_{TOTAL}$, and $T2_{TOTAL}/T1$ may be 0.6 or more and 1.0 or less. For example, as shown in FIG. 1, when the laminated body 10 has two second metal layers 2, $T2_{TOTAL}$ is a total of the thicknesses of the two second metal layers 2. When $T2_{TOTAL}/T1$ is 0.6 or more, peeling of the second metal layer 2 from the first metal layer 1 is likely to be suppressed, and the laminated body 10 is likely to have sufficiently high tensile strength. As $T2_{TOTAL}/T1$ is smaller, the raw material cost of the laminated body 10 (second metal layer 2) is suppressed. When $T2_{TOTAL}/T1$ is 1.0 or less, peeling of the second metal layer 2 from the first metal layer 1 is likely to be suppressed, and a lithium ion secondary battery containing the laminated body 10 is likely to have a sufficiently high energy density. Even when the second metal layer 2 constituting the laminated body 10 is only one layer, T2/T1 may be 0.6 or more and 1.0 or less for the same reason as described above. A thickness T3 of one negative electrode active material layer 3 may be, for example, 10 μm or more and 300 μm or less. Each of the thickness T1 of the first metal layer 1, the thickness T2 of the second metal layer 2, and the thickness T3 of the negative electrode active material layer 3 may be uniform.

Dimensions of each of the first metal layer 1, the second metal layer 2, and the negative electrode active material layer in a direction perpendicular to a direction of lamination may be approximately equal to each other. For example, a width of each of the first metal layer 1, the second metal layer 2, and the negative electrode active material layer 3 in the direction perpendicular to the direction of lamination may be several tens mm or more and several hundreds mm or less. A length of each of the first metal layer 1, the second metal layer 2, and the negative electrode active material layer 3 in the direction perpendicular to the direction of lamination may be several tens mm or more and several thousands mm or less.

The present invention is not necessarily limited to the above-described embodiments. Various modifications of the present invention are possible to the extent that the gist of the present invention is maintained, and these modified examples are also included in the present invention.

For example, the second metal layer may be formed by a vapor phase growth method. The vapor phase growth method may be, for example, a metal organic physical vapor deposition method (MOPVD) such as sputtering, or a metal organic chemical vapor deposition method (MOCVD).

The laminated body according to the present invention may be used as a heat release material or an electromagnetic shielding material. Along with processing of the heat release material or the electromagnetic shielding material, stress acts on the heat release material or the electromagnetic shielding material. According to the present invention, peeling of the second metal layer 2 from the first metal layer 1 along with the processing of the heat dissipation material or the electromagnetic shielding material can be suppressed.

EXAMPLES

The present invention will be explained in detail by the following Examples and Comparative Examples. The present invention is not limited by the following Examples.

[Pretreatment of First Metal Layer]

As a first metal layer, a commercially available electrolytic copper foil was used. The thickness of the first metal layer was 4.5 μm. The thickness of the first metal layer was uniform. Organic matters adhering to the surface of the first metal layer was removed by immersing the first metal layer in an acidic degreasing solution for one minute. As the degreasing solution, THRU-CUP MSC-3-A manufactured by C. Uyemura & Co., Ltd. was used. After degreasing, the first metal layer was washed by immersing the first metal layer in pure water for one minute.

After the washing, the first metal layer was immersed in dilute sulfuric acid for one minute to remove a natural oxide film present on the surface of the first metal layer. A concentration of the dilute sulfuric acid was 10% by mass. After removing the natural oxide film, the first metal layer was washed by immersing the first metal layer in pure water for one minute.

Laminated body of each of Examples 1 to 13 and Comparative Examples 1 to 4 was produced by the following method using the first metal layer having undergone the above pretreatment.

Example 1

A second metal layer was formed on both surfaces of the first metal layer by the following electrolytic plating. That is, a laminated body composed of a first metal layer and a second metal layer laminated on both surfaces of the first metal layer was formed by electrolytic plating.

The second metal layer of Example 1 consisted of a first nickel-containing layer L1 laminated directly on the surface of the first metal layer, a second nickel-containing layer L2 laminated directly on the first nickel-containing layer L1, and a third nickel-containing layer L3 laminated directly on the second nickel-containing layer L2. The surface of the first nickel-containing layer L1 in contact with the first metal layer corresponds to the first surface of the second metal layer.

In electrolytic plating, a first metal layer and another electrode connected to a power supply were immersed in a plating solution, and a current was applied to the first metal layer and the other electrode. The plating solution contained nickel sulfate hexahydrate, sodium tungstate dihydrate, and trisodium citrate. A content of nickel sulfate hexahydrate in the plating solution was 60 g/L. A content of sodium tungstate dihydrate in the plating solution was 100 g/L. A content of trisodium citrate in the plating solution was 145 g/L. A pH of the plating solution was adjusted to 5.0. A temperature of the plating solution was adjusted to 50° C.

<Formation of First Nickel-Containing Layer L1>

The first nickel-containing layer L1 was formed on the surface of the first metal layer by adjusting a current density of the first metal layer during electrolytic plating to 5 A/dm² and continuing electrolytic plating for 0.5 minutes.

<Formation of Second Nickel-Containing Layer L2>

Before forming the second nickel-containing layer L2, the surface of the first nickel-containing layer L1 was washed by immersing the first metal layer on which the first nickel-containing layer L1 was formed, in pure water for one minute.

The first metal layer on which the first nickel-containing layer L1 was formed was immersed in the plating solution together with another electrode. A second nickel-containing layer L2 was formed on the surface of the first nickel-containing layer L1 by adjusting a current density of the first metal layer during electrolytic plating to 3 A/dm² and continuing electrolytic plating for 0.8 minutes.

<Formation of Third Nickel-Containing Layer L3>

Before forming the third nickel-containing layer L3, the surface of the second nickel-containing layer L2 was washed by immersing the first metal layer on which the second nickel-containing layer L2 was formed, in pure water for one minute.

The first metal layer on which the second nickel-containing layer L2 was formed was immersed in the plating solution together with another electrode. The third nickel-containing layer L3 was formed on the surface of the second nickel-containing layer L2 by adjusting a current density of the first metal layer during electrolytic plating to 2 A/dm² and continuing electrolytic plating for 1.3 minutes.

A laminated body formed by the above-described plating method was immersed in pure water for one minute to wash the laminated body. After washing the laminated body, water adhering to the laminated body was removed. After removing water, a heat treatment of the laminated body was carried out at 110° C. for 6 hours.

A laminated body of Example 1 was produced by the above-described method. In the case of Example 1, an exposed surface of the third nickel-containing layer L3 corresponds to a second surface of the second metal layer.

Example 2

In the case of Example 2, only the first nickel-containing layer L1 was formed as the second metal layer on both surfaces of the first metal layer. In the process of forming the first nickel-containing layer L1 of Example 2, a current density of the first metal layer during electrolytic plating was continuously decreased from 5 A/dm² to 2 A/dm² along with the passage of time. A duration time of electrolytic plating of Example 2 was adjusted so that the integrated current of the first metal layer during electrolytic plating was the same as that in Example 1.

A laminated body of Example 2 was produced in the same manner as in Example 1, except for the above-described matters. In the case of Example 2, an exposed surface of the first nickel-containing layer L1 corresponds to the second surface of the second metal layer.

Example 3

In the process of forming the first nickel-containing layer L1 of Example 3, a current density of the first metal layer was adjusted to 5 A/dm², and electrolytic plating was continued for 0.2 minutes.

In the process of forming the second nickel-containing layer L2 of Example 3, a current density of the first metal layer was adjusted to 4 A/dm², and electrolytic plating was continued for 0.4 minutes.

In the process of forming the third nickel-containing layer L3 of Example 3, a current density of the first metal layer was adjusted to 3 A/dm², and electrolytic plating was continued for 0.7 minutes.

In the case of Example 3, after washing the surface of the third nickel-containing layer L3 using pure water, a fourth nickel-containing layer L4 was formed on the surface of the third nickel-containing layer L3. That is, the second metal layer of Example 3 consisted of the first nickel-containing layer L1 laminated directly on the surface of the first metal layer, the second nickel-containing layer L2 laminated directly on the first nickel-containing layer L1, the third nickel-containing layer L3 laminated directly on the second nickel-containing layer L2, and the fourth nickel-containing layer L4 laminated directly on the third nickel-containing layer L3.

In the process of forming the fourth nickel-containing layer L4, a current density of the first metal layer was adjusted to 2 A/dm², and electrolytic plating was continued for 1.3 minutes.

A laminated body of Example 3 was produced in the same manner as in Example 1, except for the above-described matters. In the case of Example 3, an exposed surface of the fourth nickel-containing layer L4 corresponds to the second surface of the second metal layer.

Example 4

In the process of forming the first nickel-containing layer L1 of Example 4, a current density of the first metal layer was adjusted to 5 A/dm², and electrolytic plating was continued for 0.5 minutes.

In the process of forming the second nickel-containing layer L2 of Example 4, a current density of the first metal layer was adjusted to 2 A/dm², and electrolytic plating was continued for 5 minutes.

In the case of Example 4, the third nickel-containing layer L3 was not formed.

A laminated body of Example 4 was produced in the same manner as in Example 1, except for the above-described matters. In the case of Example 4, an exposed surface of the second nickel-containing layer L2 corresponds to the second surface of the second metal layer.

Example 5

In the case of Example 5, the second metal layer was formed on both surfaces of the first metal layer by the following electroless plating instead of electrolytic plating. The second metal layer of Example 5 consisted of the first nickel-containing layer L1 laminated directly on the surface of the first metal layer, the second nickel-containing layer L2 laminated directly on the first nickel-containing layer L1, and the third nickel-containing layer L3 laminated directly on the second nickel-containing layer L2.

<Catalyst Treatment>

Before forming the first nickel-containing layer L1, a catalyst treatment of the surface of the first metal layer was carried out. In the catalyst treatment, a catalyst (palladium sulfate) was caused to adhere to the surface of the first metal layer by immersing the first metal layer in a catalyst treatment solution for one minute. A temperature of the catalyst treatment solution was adjusted to 40° C. As the catalyst treatment solution, ACCEMULTA MNK-4-M manufactured by C. Uyemura & Co., Ltd. was used.

<Formation of First Nickel-Containing Layer L1>

In the process of forming the first nickel-containing layer L1, the first metal layer was immersed in an electroless nickel plating solution. The electroless nickel plating solution used for forming the first nickel-containing layer L1 was TOP NICORON LPH manufactured by OKUNO Chemical Industries Co., Ltd. The electroless nickel plating solution contained sodium hypophosphite as a reducing agent. A temperature of the electroless nickel plating solution was adjusted to 90° C. A duration time of electroless plating was 2 minutes.

<Formation of Second Nickel-Containing Layer L2>

Before forming the second nickel-containing layer L2, the surface of the first nickel-containing layer L1 was washed by immersing the first metal layer on which the first nickel-containing layer L1 was formed, in pure water for one minute. After washing the surface of the first nickel-containing layer L1 and before forming the second nickel-containing layer L2, the catalyst treatment of the surface of the first nickel-containing layer L1 was carried out by the above-described method.

In the process of forming the second nickel-containing layer L2, the first metal layer on which the first nickel-containing layer L1 was formed was immersed in an electroless nickel plating solution. The electroless nickel plating solution used for forming the second nickel-containing layer L2 was ICP NICORON GM manufactured by OKUNO Chemical Industries Co., Ltd. The electroless nickel plating solution contained sodium hypophosphite as a reducing agent. A temperature of the electroless nickel plating solution was adjusted to 80° C. A duration time of electroless plating was 2.5 minutes.

<Formation of Third Nickel-Containing Layer L3>

Before forming the third nickel-containing layer L3, the surface of the second nickel-containing layer L2 was washed by immersing the first metal layer on which the second nickel-containing layer L2 was formed, in pure water for one minute. After washing the surface of the second nickel-containing layer L2 and before forming the third nickel-containing layer L3, the catalyst treatment of the surface of the second nickel-containing layer L2 was carried out by the above-described method.

In the process of forming the third nickel-containing layer L3, the first metal layer on which the second nickel-containing layer L2 was formed was immersed in an electroless nickel plating solution. The electroless nickel plating solution used for forming the third nickel-containing layer L3 was ICP NICORON SOF manufactured by OKUNO Chemical Industries Co., Ltd. The electroless nickel plating solution contained sodium hypophosphite as a reducing agent. A temperature of the electroless nickel plating solution was adjusted to 85° C. A duration time of electroless plating was 2.5 minutes. After forming the third nickel-containing layer L3, the laminated body was washed by immersing the laminated body in pure water for one minute.

A laminated body of Example 5 was produced by the above-described method. In the case of Example 5, an exposed surface of the third nickel-containing layer L3 corresponds to the second surface of the second metal layer.

Example 6

In the case of Example 6, the third nickel-containing layer L3 was not formed. A laminated body of Example 6 was produced in the same manner as in Example 5, except for the matter. In the case of Example 6, an exposed surface of the second nickel-containing layer L2 corresponds to the second surface of the second metal layer.

Example 7

Electrolytic plating of Example 7 was carried out using a plating solution having a composition different from that of the plating solution of Example 1. The plating solution of Example 7 contained nickel sulfate hexahydrate, nickel chloride hexahydrate, boric acid, trisodium citrate, and sodium hydrogen phosphite. A content of nickel sulfate hexahydrate in the plating solution of Example 7 was 100 g/L. A content of nickel chloride hexahydrate in the plating solution of Example 7 was 30 g/L. A content of boric acid in the plating solution of Example 7 was 30 g/L. A content of trisodium citrate in the plating solution of Example 7 was 30 g/L. A content of sodium hydrogen phosphite in the plating solution of Example 7 was 20 g/L. A pH of the plating solution of Example 7 was adjusted to 3.5. A temperature of the plating solution of Example 7 was adjusted to 60° C.

In the case of Example 7, only the first nickel-containing layer L1 was formed as the second metal layer on both surfaces of the first metal layer. In the process of forming the first nickel-containing layer L1 of Example 7, a current density of the first metal layer during electrolytic plating was continuously decreased from 4 A/dm$^2$ to 0.5 A/dm$^2$ along with the passage of time. A duration time of electrolytic plating of Example 7 was adjusted so that the integrated current of the first metal layer during electrolytic plating was the same as that in Example 5.

A laminated body of Example 7 was produced in the same manner as in Example 1, except for the above-described matters. In the case of Example 7, an exposed surface of the first nickel-containing layer L1 corresponds to the second surface of the second metal layer.

Example 8

The content of nickel in the electroless nickel plating solution used for forming the second nickel-containing layer L2 of Example 8 was larger than the content of nickel in the electroless nickel plating solution used for forming the second nickel-containing layer L2 of Example 5. A laminated body of Example 8 was produced in the same manner as in Example 5, except for the matter. In the case of Example 8, an exposed surface of the third nickel-containing layer L3 corresponds to the second surface of the second metal layer.

Example 9

The first nickel-containing layer L1 of Example 9 was formed by electrolytic plating using the following first plating solution.

A content of nickel sulfate hexahydrate in the first plating solution of Example 9 was 40 g/L. A content of sodium tungstate dihydrate in the first plating solution of Example 9 was 45 g/L. A content of trisodium citrate in the first plating solution of Example 9 was 80 g/L. A pH of the first plating solution of Example 9 was adjusted to 7.0. In the process of forming the first nickel-containing layer L1 of Example 9, a current density of the first metal layer was adjusted to 5 A/dm$^2$, and electrolytic plating was continued for 3 minutes.

The second nickel-containing layer L2 of Example 9 was formed by electrolytic plating using the following second plating solution.

A content of nickel sulfate hexahydrate in the second plating solution of Example 9 was 30 g/L. A content of sodium tungstate dihydrate in the second plating solution of Example 9 was 60 g/L. A content of trisodium citrate in the second plating solution of Example 9 was 80 g/L. A pH of the second plating solution of Example 9 was adjusted to 7.0. In the process of forming the second nickel-containing layer L2 of Example 9, a current density of the first metal layer was adjusted to 5 A/dm$^2$, and electrolytic plating was continued for 3 minutes.

In the case of Example 9, the third nickel-containing layer L3 was not formed.

A laminated body of Example 9 was produced in the same manner as in Example 1, except for the above-described matters. In the case of Example 9, an exposed surface of the second nickel-containing layer L2 corresponds to the second surface of the second metal layer.

Example 10

The first nickel-containing layer L1 of Example 10 was formed by electrolytic plating using the following first plating solution.

A content of nickel sulfate hexahydrate in the first plating solution of Example 10 was 60 g/L. A content of sodium tungstate dihydrate in the first plating solution of Example 10 was 30 g/L. A content of trisodium citrate in the first plating solution of Example 10 was 80 g/L. A pH of the first plating solution of Example 10 was adjusted to 7.0. In the process of forming the first nickel-containing layer L1 of Example 10, a current density of the first metal layer was adjusted to 5 A/dm$^2$, and electrolytic plating was continued for one minute.

The second nickel-containing layer L2 of Example 10 was formed by electrolytic plating using the following second plating solution.

A content of nickel sulfate hexahydrate in the second plating solution of Example 10 was 40 g/L. A content of sodium tungstate dihydrate in the second plating solution of Example 10 was 45 g/L. A content of trisodium citrate in the second plating solution of Example 10 was 80 g/L. A pH of the second plating solution of Example 10 was adjusted to 7.0. In the process of forming the second nickel-containing layer L2 of Example 10, a current density of the first metal layer was adjusted to 5 A/dm$^2$, and electrolytic plating was continued for one minute.

The third nickel-containing layer L3 of Example 10 was formed by electrolytic plating using the following third plating solution.

A content of nickel sulfate hexahydrate in the third plating solution of Example 10 was 30 g/L. A content of sodium tungstate dihydrate in the third plating solution of Example 10 was 60 g/L. A content of trisodium citrate in the third plating solution of Example 10 was 80 g/L. A pH of the third plating solution of Example 10 was adjusted to 7.0. In the process of forming the third nickel-containing layer L3 of Example 10, a current density of the first metal layer was adjusted to 5 A/dm$^2$, and electrolytic plating was continued for one minute.

A laminated body of Example 10 was produced in the same manner as in Example 1, except for the above-described matters. In the case of Example 10, an exposed surface of the third nickel-containing layer L3 corresponds to the second surface of the second metal layer.

Example 11

A first nickel-containing layer L1 of Example 11 was formed by electrolytic plating using the following first plating solution.

A content of nickel sulfate hexahydrate in the first plating solution of Example 11 was 70 g/L. A content of sodium tungstate dihydrate in the first plating solution of Example 11 was 15 g/L. A content of trisodium citrate in the first plating solution of Example 11 was 80 g/L. A pH of the first plating solution of Example 11 was adjusted to 7.0. In the process of forming the first nickel-containing layer L1 of Example 11, a current density of the first metal layer was adjusted to 5 A/dm², and electrolytic plating was continued for 1.5 minutes.

The second nickel-containing layer L2 of Example 11 was formed by electrolytic plating using the following second plating solution.

A content of nickel sulfate hexahydrate in the second plating solution of Example 11 was 60 g/L. A content of sodium tungstate dihydrate in the second plating solution of Example 11 was 8 g/L. A content of trisodium citrate in the second plating solution of Example 11 was 30 g/L. A pH of the second plating solution of Example 11 was adjusted to 7.0. In the process of forming the second nickel-containing layer L2 of Example 11, a current density of the first metal layer was adjusted to 5 A/dm², and electrolytic plating was continued for 2 minutes.

In the case of Example 11, the third nickel-containing layer L3 was not formed.

A laminated body of Example 11 was produced in the same manner as in Example 1, except for the above-described matters. In the case of Example 11, an exposed surface of the second nickel-containing layer L2 corresponds to the second surface of the second metal layer.

Example 12

The first nickel-containing layer L1 of Example 12 was formed by electrolytic plating using the following first plating solution.

A content of nickel sulfate hexahydrate in the first plating solution of Example 12 was 70 g/L. A content of sodium tungstate dihydrate in the first plating solution of Example 12 was 8 g/L. A content of trisodium citrate in the first plating solution of Example 12 was 80 g/L. A pH of the first plating solution of Example 12 was adjusted to 7.0. In the process of forming the first nickel-containing layer L1 of Example 12, a current density of the first metal layer was adjusted to 5 A/dm², and electrolytic plating was continued for one minute.

The second nickel-containing layer L2 of Example 12 was formed by electrolytic plating using the following second plating solution.

A content of nickel sulfate hexahydrate in the second plating solution of Example 12 was 70 g/L. A content of sodium tungstate dihydrate in the second plating solution of Example 12 was 15 g/L. A content of trisodium citrate in the second plating solution of Example 12 was 80 g/L. A pH of the second plating solution of Example 12 was adjusted to 7.0. In the process of forming the second nickel-containing layer L2 of Example 12, a current density of the first metal layer was adjusted to 5 A/dm², and electrolytic plating was continued for one minute.

The third nickel-containing layer L3 of Example 12 was formed by electrolytic plating using the following third plating solution.

A content of nickel sulfate hexahydrate in the third plating solution of Example 12 was 60 g/L. A content of sodium tungstate dihydrate in the third plating solution of Example 12 was 30 g/L. A content of trisodium citrate in the third plating solution of Example 12 was 80 g/L. A pH of the third plating solution of Example 12 was adjusted to 7.0. In the process of forming the third nickel-containing layer L3 of Example 12, a current density of the first metal layer was adjusted to 5 A/dm², and electrolytic plating was continued for one minute.

A laminated body of Example 12 was produced in the same manner as in Example 1, except for the above-described matters. In the case of Example 12, an exposed surface of the third nickel-containing layer L3 corresponds to the second surface of the second metal layer.

Example 13

The first nickel-containing layer L1 of Example 13 was formed by electrolytic plating using the following first plating solution.

A content of nickel sulfate hexahydrate in the first plating solution of Example 13 was 70 g/L. A content of sodium tungstate dihydrate in the first plating solution of Example 13 was 4 g/L. A content of trisodium citrate in the first plating solution of Example 13 was 80 g/L. A pH of the first plating solution of Example 13 was adjusted to 7.0. In the process of forming the first nickel-containing layer L1 of Example 13, a current density of the first metal layer was adjusted to 5 A/dm², and electrolytic plating was continued for 1.5 minutes.

The second nickel-containing layer L2 of Example 13 was formed by electrolytic plating using the following second plating solution.

A content of nickel sulfate hexahydrate in the second plating solution of Example 13 was 70 g/L. A content of sodium tungstate dihydrate in the second plating solution of Example 13 was 8 g/L. A content of trisodium citrate in the second plating solution of Example 13 was 80 g/L. A pH of the second plating solution of Example 13 was adjusted to 7.0. In the process of forming the second nickel-containing layer L2 of Example 13, a current density of the first metal layer was adjusted to 5 A/dm², and electrolytic plating was continued for 1.5 minutes.

In the case of Example 13, the third nickel-containing layer L3 was not formed.

A laminated body of Example 13 was produced in the same manner as in Example 1, except for the above-described matter. In the case of Example 13, an exposed surface of the second nickel-containing layer L2 corresponds to the second surface of the second metal layer.

Comparative Example 1

In the case of Comparative Example 1, only the first nickel-containing layer L1 was formed as the second metal layer on both surfaces of the first metal layer.

Electrolytic plating of Comparative Example 1 was carried out by using a plating solution having a composition different from that of the plating solution of Example 1. The plating solution of Comparative Example 1 contained nickel sulfate hexahydrate, nickel chloride hexahydrate, and boric acid. A content of nickel sulfate hexahydrate in the plating solution of Comparative Example 1 was 240 g/L. A content of nickel chloride hexahydrate in the plating solution of Comparative Example 1 was 45 g/L. A content of boric acid in the plating solution of Comparative Example 1 was 30 g/L. A pH of the plating solution was adjusted to 4.2. A temperature of the plating solution was adjusted to 40° C.

In the process of forming the first nickel-containing layer L1 of Comparative Example 1, a current density of the first metal layer during electrolytic plating was adjusted to 5 A/dm², and electrolytic plating was continued for 1.5 minutes.

A laminated body of Comparative Example 1 was produced in the same manner as in Example 1, except for the above-described matters. In the case of Comparative Example 1, an exposed surface of the first nickel-containing layer L1 corresponds to the second surface of the second metal layer.

Comparative Example 2

In the case of Comparative Example 2, only the first nickel-containing layer L1 was formed as the second metal layer on both surfaces of the first metal layer.

In the case of Comparative Example 2, the first nickel-containing layer L1 was formed on the surface of the first metal layer by adjusting a current density of the first metal layer during electrolytic plating to 5 A/dm$^2$ and continuing electrolytic plating for 2 minutes.

A laminated body of Comparative Example 2 was produced in the same manner as in Example 1, except for the above-described matters. In the case of Comparative Example 2, an exposed surface of the first nickel-containing layer L1 corresponds to the second surface of the second metal layer.

Comparative Example 3

In the case of Comparative Example 3, only the first nickel-containing layer L1 was formed as the second metal layer on both surfaces of the first metal layer.

An electroless nickel plating solution used for forming the first nickel-containing layer L1 of Comparative Example 3 was the same as the electroless nickel plating solution used for forming the third nickel-containing layer L3 of Example 5. In the process of forming the first nickel-containing layer L1 of Comparative Example 3, a duration time of electroless plating was 7 minutes.

A laminated body of Comparative Example 3 was produced in the same manner as in Example 5, except for the above-described matters. In the case of Comparative Example 3, an exposed surface of the first nickel-containing layer L1 corresponds to the second surface of the second metal layer.

Comparative Example 4

In the process of forming the first nickel-containing layer L1 of Comparative Example 4, a current density of the first metal layer during electrolytic plating was adjusted to 3 A/dm$^2$, and electrolytic plating was continued for 0.8 minutes.

In the process of forming the second nickel-containing layer L2 of Comparative Example 4, a current density of the first metal layer during electrolytic plating was adjusted to 4 A/dm$^2$, and electrolytic plating was continued for 0.6 minutes.

In the process of forming the third nickel-containing layer L3 of Comparative Example 4, a current density of the first metal layer during electrolytic plating was adjusted to 5 A/dm$^2$, and electrolytic plating was continued for 0.5 minutes.

A laminated body of Comparative Example 4 was produced in the same manner as in Example 1, except for the above-described matters. In the case of Comparative Example 4, an exposed surface of the third nickel-containing layer L3 to corresponds to the second surface of the second metal layer.

[Analysis of Laminated Body]

The laminated body of each of Examples 1 to 13 and Comparative Examples 1 to 4 was analyzed by the following methods.

The laminated body was cut in a direction of lamination (direction perpendicular to the first surface of the second metal layer). A cross-section of the laminated body was observed with a scanning electron microscope (SEM). A composition of the second metal layer exposed at the cross-section of the laminated body was analyzed by energy dispersive X-ray spectroscopy (EDS) along a thickness direction D of the second metal layer.

It was confirmed that the second metal layer of each of Examples 1 to 13 and Comparative Examples 1 to 4 contained the constituent elements shown in Table 1 below.

A content [Ni] of Ni in each nickel-containing layer constituting the second metal layer of each of Examples 1 to 13 and Comparative Examples 1 to 4 is shown in Table 1 below. L1 in Table 1 means the first nickel-containing layer. L2 in Table 1 means the second nickel-containing layer. L3 in Table 1 means the third nickel-containing layer. L4 in Table 1 means the fourth nickel-containing layer. The content [Ni] of Ni in each nickel-containing layer was approximately constant, except for Examples 2 and 7.

In the case of Examples 2 and 7, the content [Ni] of Ni in the second metal layer (first nickel-containing layer L1) decreased continuously along the thickness direction D of the second metal layer. That is, in the case of Examples 2 and 7, the content of Ni in the second metal layer was the maximum in the vicinity of the first surface of the second metal layer and was the minimum in the vicinity of the second surface of the second metal layer.

In the case of Example 2, the maximum value of the content of Ni in the second metal layer was 69% by mass, and the minimum value of the content of Ni in the second metal layer was 62% by mass.

In the case of Example 7, the maximum value of the content of Ni in the second metal layer was 99% by mass, and the minimum value of the content of Ni in the second metal layer was 87% by mass.

Δ[Ni] of each of Examples 1 to 13 and Comparative Example 4 is shown in Table 1 below. The definition of the Δ[Ni] is as described above.

In all of the cases of Examples 1 to 13 and Comparative Examples 1 to 4, a thickness of each nickel-containing layer constituting the second metal layer was uniform. The thickness of each nickel-containing layer was measured at the cross-section of the laminated body. The thickness of each nickel-containing layer is shown in Table 1 below.

[Bending Test]

Figure 4:
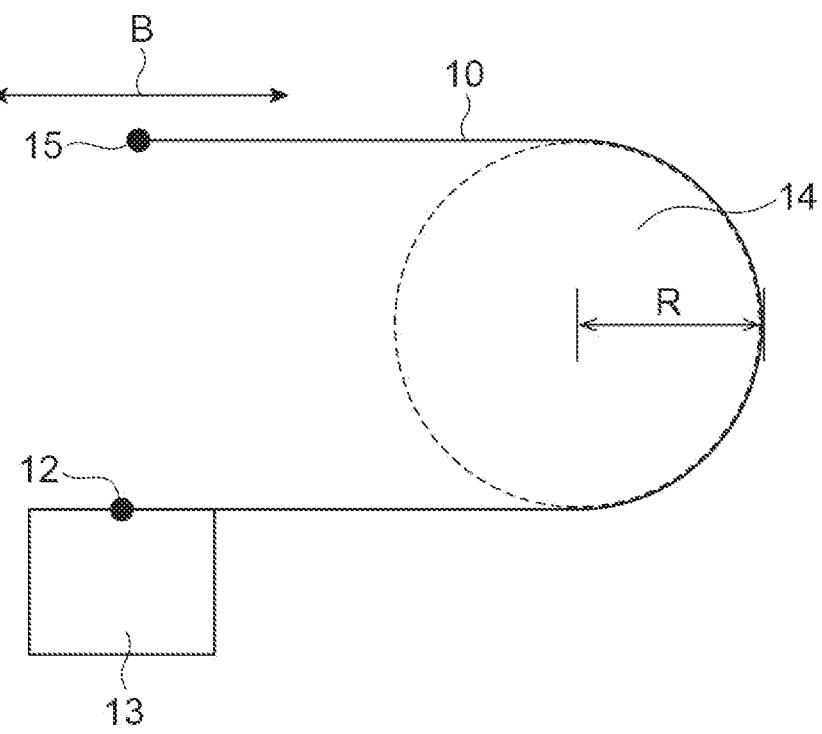
FIG. 4 is a schematic view showing an outline of a bending test.

The following bending test according to JISC5016 was carried out by using the laminated body of each of Examples 1 to 13 and Comparative Examples 1 to 4. An outline of the bending test is shown in FIG. 4.

A shape of the laminated body 10 used for the bending test was a rectangular shape. A length of the long side of the laminated body 10 (length of the laminated body 10 in a direction perpendicular to the direction of lamination) was 150 mm. A length of the short side of the laminated body 10 (width of the laminated body in the direction perpendicular to the direction of lamination) was 50 mm.

A cylindrical body 14 harder than the laminated body 10 was used for the bending test. A height of the cylindrical body 14 was larger than the length of the short side of the laminated body 10. A radius of curvature R of an outer peripheral surface of the cylindrical body 14 was 5 mm.

The outer peripheral surface of the cylindrical body 14 was in contact with the central part of the laminated body 10 in the long side direction of the laminated body 10 so that the height direction of the cylindrical body 14 was parallel to the short side of the laminated body 10. The laminated body 10 was folded so that the surface of the laminated body 10 (the second surface of the second metal layer) was in close contact with the outer peripheral surface of the cylindrical body 14. One edge 12 of the folded laminated body 10 was fixed to a jig 13. The other edge 15 of the folded laminated body 10 was repeatedly reciprocated along a direction B (the long side direction of the laminated body 10) for 1 minute. A distance of the reciprocating movement of the edge 15 was 30 mm. The reciprocating cycle was 150 times/minute.

[Peeling Test]

After the bending test, an adhesive tape was attached to a site (the second surface of the second metal layer) of the laminated body 10, the site that had been in close contact with the outer peripheral surface of the cylindrical body 14. The adhesive tape was peeled from the laminated body 10, and then a sum "a" of areas of parts where the second metal layer was adhered on the surface of the adhesive tape, was measured. A peeling ratio $R_P$ (unit: %) defined by the following Mathematical Formula 1 was calculated. A in the Mathematical Formula 1 represents an area of the entire surface of the adhesive tape. As the adhesive tape, a cellophane adhesive tape specified in JIS Z 1522 was used.

$$R_P = 100 \times a/A \qquad (1)$$

The result of the peeling test of each of the above-mentioned Examples 1 to 13 and Comparative Examples 1 to 4 is shown in Table 1 below. A in Table 1 means that the peeling ratio $R_P$ is 0%. B in Table 1 means that the peeling ratio $R_P$ is more than 0% and less than 10%. C in Table 1 means that the peeling ratio $R_P$ is 10% or more.

REFERENCE SIGNS LIST

1: first metal layer, 2: second metal layer, 3: negative electrode active material layer, 10: laminated body (current collector), 20: negative electrode, D: thickness direction of second metal layer, S1: first surface of second metal layer, S2: second surface of second metal layer.

The invention claimed is:

1. A laminated body comprising:

a first metal layer containing copper; and a second metal layer containing nickel and laminated directly on the first metal layer, wherein a first surface of the second metal layer is a surface in contact with the first metal layer, a second surface of the second metal layer is a reverse face of the first surface, a thickness direction of the second metal layer is a direction approximately perpendicular to the first surface and oriented from the first surface toward the second surface, a unit of a content of nickel in the second metal layer is % by mass, and the content of nickel in the second metal layer decreases along the thickness direction.

2. The laminated body according to claim 1, wherein the second metal layer further contains at least one element selected from the group consisting of phosphorus and tungsten.

3. The laminated body according to claim 1, wherein the second metal layer consists of a plurality of nickel-containing layers laminated in the thickness direction, and a content of nickel in each of the plurality of nickel-containing layers is different from each other.

TABLE 1

| Unit | Constituent element — | L1 Thickness μm | L1 [Ni] mass % | L2 Thickness μm | L2 [Ni] mass % | L3 Thickness μm | L3 [Ni] mass % | L4 Thickness μm | L4 [Ni] mass % | Δ[Ni] mass % | Peeling test — |
|---|---|---|---|---|---|---|---|---|---|---|---|
| Example 1 | Ni, W | 0.5 | 67 | 0.5 | 65 | 0.5 | 61 | — | — | 6 | A |
| Example 2 | Ni, W | 2.0 | 69→62 | — | — | — | — | — | — | 7 | A |
| Example 3 | Ni, W | 0.2 | 68 | 0.3 | 66 | 0.4 | 63 | 0.5 | 60 | 8 | B |
| Example 4 | Ni, W | 0.5 | 67 | 1.0 | 61 | — | — | — | — | 6 | B |
| Example 5 | Ni, P | 0.5 | 99 | 0.5 | 93 | 0.5 | 88 | — | — | 11 | A |
| Example 6 | Ni, P | 0.5 | 99 | 0.5 | 93 | — | — | — | — | 6 | A |
| Example 7 | Ni, P | 1.5 | 99→87 | — | — | — | — | — | — | 12 | B |
| Example 8 | Ni, P | 0.5 | 99 | 0.5 | 94 | 0.5 | 88 | — | — | 11 | B |
| Example 9 | Ni, W | 0.8 | 70 | 0.7 | 60 | — | — | — | — | 10 | B |
| Example 10 | Ni, W | 0.5 | 80 | 0.4 | 70 | 0.5 | 62 | — | — | 18 | A |
| Example 11 | Ni, W | 0.7 | 88 | 0.8 | 79 | — | — | — | — | 9 | B |
| Example 12 | Ni, W | 0.5 | 95 | 0.4 | 89 | 0.4 | 81 | — | — | 14 | A |
| Example 13 | Ni, W | 0.8 | 98 | 0.8 | 94 | — | — | — | — | 4 | B |
| Comparative Example 1 | Ni | 1.5 | 100 | — | — | — | — | — | — | — | C |
| Comparative Example 2 | Ni, W | 2.0 | 70 | — | — | — | — | — | — | — | C |
| Comparative Example 3 | Ni, P | 1.5 | 88 | — | — | — | — | — | — | — | C |
| Comparative Example 4 | Ni, W | 0.5 | 61 | 0.5 | 65 | 0.5 | 67 | — | — | 6 | C |

INDUSTRIAL APPLICABILITY

For example, the laminated body according to one aspect of the present invention may be used for a negative electrode current collector of a lithium ion secondary battery.

4. The laminated body according to claim 1, wherein a thickness of the first metal layer is represented by T1, a thickness of the second metal layer is represented by T2, and T2/T1 is 0.6 or more and 1.0 or less.

5. The laminated body according to claim 1,
wherein the content of nickel in the second metal layer is the highest in the vicinity of the first surface, decreases stepwise along the thickness direction, and is the lowest in the vicinity of the second surface.

6. The laminated body according to claim 1,
wherein the content of nickel in the second metal layer is the highest in the vicinity of the first surface, decreases continuously along the thickness direction, and is the lowest in the vicinity of the second surface.

7. A negative electrode current collector for a lithium ion secondary battery,
the negative electrode current collector comprising the laminated body according to claim 1.

8. A negative electrode for a lithium ion secondary battery,
the negative electrode comprising:
the negative electrode current collector according to claim 7; and
a negative electrode active material layer containing a negative electrode active material,
wherein the negative electrode active material layer is laminated directly on the second surface of the second metal layer.

9. The negative electrode according to claim 8,
wherein the negative electrode active material contains silicon.

\* \* \* \* \*